(12) United States Patent
Jansen et al.

(10) Patent No.: US 8,268,932 B2
(45) Date of Patent: Sep. 18, 2012

(54) METHOD FOR CHEMICAL ANCHORING

(75) Inventors: Johan Franz Gradus Antonius Jansen, Geleen (NL); Michael Alphonsus Cornelis Johannes Van Dijck, Bree-Opitter (NL); Marco Marcus Matheus Driessen, Maasbracht (NL)

(73) Assignee: DSM IP Assets B.V., Heerlen (NL)

( * ) Notice: Subject to any disclaimer, the term of this patent is extended or adjusted under 35 U.S.C. 154(b) by 388 days.

(21) Appl. No.: 12/089,064

(22) PCT Filed: Oct. 5, 2006

(86) PCT No.: PCT/EP2006/009637
§ 371 (c)(1),
(2), (4) Date: Jun. 6, 2008

(87) PCT Pub. No.: WO2007/042199
PCT Pub. Date: Apr. 19, 2007

(65) Prior Publication Data
US 2008/0300361 A1 Dec. 4, 2008

(30) Foreign Application Priority Data

Oct. 7, 2005 (EP) .................................... 05077363

(51) Int. Cl.
*C08F 8/34* (2006.01)
*E04C 5/00* (2006.01)
*C08C 19/20* (2006.01)

(52) U.S. Cl. ........ 525/345; 525/350; 525/530; 523/404; 403/292; 52/698

(58) Field of Classification Search ................... 523/404; 525/345, 350, 530; 524/323
See application file for complete search history.

(56) References Cited

U.S. PATENT DOCUMENTS

| | | | | |
|---|---|---|---|---|
| 3,283,513 A * | 11/1966 | Kierans et al. | ............. | 405/259.5 |
| 3,518,211 A * | 6/1970 | Downs et al. | ................ | 523/414 |
| 3,652,476 A * | 3/1972 | Fellers et al. | ................ | 523/400 |
| 3,729,404 A * | 4/1973 | Morgan | ........................... | 522/18 |
| 4,623,702 A * | 11/1986 | Grieves et al. | ................ | 525/528 |
| 5,411,776 A * | 5/1995 | Schmidt et al. | ................ | 428/34 |
| 5,643,994 A * | 7/1997 | Kish et al. | ..................... | 524/533 |
| 5,817,426 A * | 10/1998 | Spada et al. | ................... | 428/483 |
| 5,972,423 A * | 10/1999 | Abbey et al. | ................... | 427/140 |
| 2003/0134933 A1 * | 7/2003 | Jin et al. | ........................ | 523/115 |

FOREIGN PATENT DOCUMENTS

| | | |
|---|---|---|
| EP | 0 129 394 | 12/1994 |
| EP | 0 713 015 | 5/1996 |
| JP | 55142018 A * | 11/1980 |
| JP | 61-157530 * | 7/1986 |
| JP | 61157530 A * | 7/1986 |
| JP | 2002-212513 | 7/2002 |
| WO | 00/08086 | 2/2000 |

OTHER PUBLICATIONS

International Search Report for PCT/EP2006/009637 mailed Jan. 31, 2007.

Written Opinion for PCT/EP2006/009637 mailed Jan. 31, 2007.

\* cited by examiner

*Primary Examiner* — Tae H Yoon

(74) *Attorney, Agent, or Firm* — Nixon & Vanderhye P.C.

(57) ABSTRACT

This invention relates to the use of resin compositions for chemical anchoring, wherein the resin composition comprises at least: a. a thiol-containing component, and b. a resin containing one or more reactive moieties selected from the group of: i. non-aromatic carbon double bond moieties, and ii. epoxide moieties, and an initiator. Preferably, the resin composition further comprises a diluent, more preferably a reactive diluent. Furthermore, the present invention also relates to the use of a multi-component, preferably a 2-component system of which one component contains a thiol group(s) containing component for chemical anchoring by means of cold curing.

23 Claims, No Drawings

METHOD FOR CHEMICAL ANCHORING

This application is the U.S. national phase of International Application No. PCT/EP2006/009637 filed 5 Oct. 2006 which designated the U.S. and claims priority to European Patent Application No. 05077363.9 filed 7 Oct. 2005, the entire contents of each of which are hereby incorporated by reference.

This invention relates to methods for chemical anchoring. More particularly, it relates to methods for chemical anchoring employing resin compositions containing a thiol group(s) containing component. Furthermore, the present invention also relates to the use of such resin compositions in chemical anchoring systems and to the use of a 2-component system of which one component contains a thiol group(s) containing component in chemical anchoring systems by means of cold curing.

As meant herein, chemical anchoring refers to chemical fastening of anchoring elements such as tie bars, dowels, rock bolts, screws, anchor rods in for example bore holes, natural and artificial rocks. Chemical anchoring methods using resin compositions based on epoxides, and which are cured with amines are known. Reference can, for instance, be made to EP 1118628 and EP 0974610. Such state of the art resin compositions exhibit, when cured, many desirable properties like low shrinkage etc., which makes them useful for oversized drill-holes. Moreover, upon curing, the amount of extractables is low. However, these resins cure only very slowly at room temperature and do not cure at all at lower temperatures. A further disadvantage of these resin compositions is the fact the amines employed are generally considered toxic.

This problem of insufficiently quick curing at room temperature and at temperatures below room temperature is overcome by using resin compositions based on methacrylates. Reference can, for instance, be made to EP 0713015 and EP 0761792. According to EP 0761792 at room temperature fast curing gel times in the order of several minutes can be achieved. However, these methacrylate based resin compositions for chemical anchoring exhibit, upon curing substantial shrinkage and a relatively high amount of extractables.

Accordingly there is a long felt need for methods of chemical anchoring using resin compositions that cure fast, give low shrinkage and result in a low amount of extractables.

These problems in chemical anchoring now have, surprisingly, been overcome by the use of a resin composition comprising at least:
 a. a thiol-containing component, and
 b. a resin containing one or more reactive moieties selected from the group of:
  (i) non-aromatic carbon double bond moieties,
  (ii) epoxide moieties, and
 c. an initiator.

It has been found that such resin compositions can advantageously be used as binder for chemical fastening of anchoring elements such as tie bars, dowels, rock bolts, screws, anchor rods in for example bore holes, natural and artificial rocks.

Preferably, the resin composition further comprises a diluent, more preferably a reactive diluent. The diluent, for instance, will be applied for adjustment of the viscosity of the resin composition in order to make handling thereof more easy. Moreover, adjustment of cross-linking in the cured products may be achieved if the diluent contains groups that are reactive with the reactive moieties in the resin. In such case, the diluent is called a reactive diluent. A reactive diluent may contain all kinds of such reactive groups, but the groups may also be identical to reactive moieties in the resin.

Examples of suitable reactive diluents that may be used in the context of the present invention are, for instance, dicyclopentadiene (DCPD), norbornadiene, epoxycyclohexane, epoxycyclohexene, vinyinorbornene, epoxyethyl norbornene, cyclohexanediepoxide, etc.

According to a preferred embodiment of the present invention the resin compositions used for chemical anchoring are applied as a multi-component system, preferably a 2-component system (A+B).

The use of multi-component systems, in particular of 2-component systems, is nowadays well-known in chemical anchoring applications. However no resin systems are used therein as are now taught for such use in the present patent application.

The various functionalities (i.e. the thiol-functionality as present in the thiol-containing component, and the reactive moieties as present in the resin, and optionally in the reactive diluent) can be divided in various ways over the multi-component system. For the 2-component system the following embodiments are preferred according to the invention, namely those wherein either:
 a. the A-component contains the thiol-containing component and the resin and the B-component contains the initiator, or
 b. the A-component contains the thiol-containing component and the B-component contains the initiator and the resin, or
 c. the A-component contains the resin and the B-component contains the initiator and the thiol-containing component, with the optional diluent being present in the component containing the resin.

Many thiol-containing components can suitably be employed according to the invention. These components can be aromatic phenols, for instance, thiophenols and derivatives thereof; but also aliphatic thiols can be used. Preferably, the thiol in the thiol-containing component of the resin composition is an aliphatic thiol.

Especially useful are the esters of α-mercapto acetate or β-mercapto propionate with mono alcohols, diols, triols, tetraols, pentaols and other polyols. The alcohol group, which is functionalized with the α-mercapto acetate or β-mercapto propionate, can be part of a polymer. Also mixtures of alcohols can be used.

Most preferably, the aliphatic thiol is an α-mercapto acetate or β-mercapto propionate, or a derivative or mixture thereof.

According to a preferred embodiment of the invention the thiol-functionality of the thiol-containing component in the resin composition is $\geq 2$, more preferably $\geq 3$.

Especially suitable thiols, with a thiol-functionality equal to or higher than 3 are trimethylolpropane tris-mercapto acetate, trimethylolpropane tris-mercapto propionate, pentaerythritol tetra-mercapto acetate, pentaerythritol tetra-mercapto propionate, dipentaerythritol hexa-(3-mercaptopropionate), glycerol tris-(3-mercaptopropionates), dipentaerythritol hexa-mercapto acetate, trivinylcyclohexyl polymercaptan, trithiocyanuric acid, and their ethoxylated or propoxylated derivatives.

The resin to be used in combination with the thiol-containing component can be selected from a wide variety of resins. Good results in chemical anchoring are achieved, if the resin has a molecular weight Mn between 240 and 10,000, preferably <7,000, more preferably <5,000. It is even more preferred if the resin has a molecular weight Mn between 500 and 7,000, more preferably between 1,000 and 5,000.

It is further preferred that the molecular ratio between the thiols in the thiol-containing component and the reactive moieties contained in the resin is in the range of from 3:1 to 1:5, preferably of from 1.5:1 to 1:2, more preferably about 1:1. The skilled man can easily determine the optimum of such ratio for any given composition to be applied according to the invention in chemical anchoring.

According to a preferred embodiment of the invention, the reactive moiety in the resin composition is a non-aromatic carbon double bond moiety.

The component containing such non-aromatic carbon double bond moieties in the resin compositions used for chemical anchoring according to the invention may be selected from the group consisting of all ethylenically unsaturated polymers known to the skilled man, such as, for instance, acrylate functional resins, methacrylate functional resins, allyl functional resins, vinyl functional resins, norbornene functional resins and unsaturated polyester resins.

Examples of unsaturated polyester resins for structural applications can be found in a review article by M. Malik et al. J.M.S.—Rev. Macromol. Chem. Phys., C40(2&3), p. 139-165 (2000), who describe a classification of such resins—on the basis of their structure—in five groups: (1) ortho resins; (2) iso-resins; (3) bisphenol-A-fumarates; (4) chlorendics, and (5) vinyl ester resins. Besides these classes of resins also so-called dicyclopentadiene (DCPD) resins can be distinguished. Many of such unsaturated polyesters are commercially available at large scale.

Preferably, the non-aromatic carbon double bond moiety is selected from the group of allyl, vinyl, (meth)acrylic, fumaric, maleic, itaconic, crotonic, or cinnamic double bond moieties, or of Diels Alder adducts thereof, or is present in a norbornene derivative or any other bicyclic double bond molecule.

Especially good results are achieved when the Diels-Alder adduct is an adduct with butadiene or cyclopentadiene. Of these, Diels-Alder adducts with cyclopentadiene are most preferred. When the component containing non-aromatic carbon double bond moieties is a Diels-Alder adduct, it can be either prepared by performing a Diels-Alder adduct formation reaction on a starting resins containing non-aromatic carbon double bond moieties. Alternatively, however, it can be prepared by using a Diels-Alder adduct from monomeric compounds as a starting material from the resin preparation. In particular, bicyclo-[2.2.1]-hept-5-ene-2,3-dicarboxylic anhydride (the Diels-Alder adduct of maleic acid and cyclopentadiene) is applied, or the corresponding Diels-Alder adduct formed with maleic acid groups in the resin. Such resins then can be called HIMIC resins. Most preferably, the Diels-Alder adduct is incorporated in the backbone of the resin.

In one of the most preferred embodiments of the invention the non-aromatic carbon double bond is an allylic double bond moiety or is present in a norbornene derivative.

For clarity purposes, suitable examples of norbornene derivatives can conveniently be described by formula 1

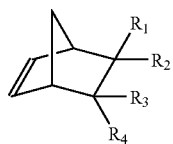

wherein each of the groups $R_1$, $R_2$, $R_3$, and $R_4$, can independently be chosen, for instance, from the group of hydrogen, carboxylates, nitriles, alkyl groups, alkenyl groups, aryl groups, and/or substituted derivatives of such groups, or wherein two or more of such groups may form additional ring structures, or wherein any of such groups is part of a polymeric residue.

According to another preferred embodiment of the invention the resin contains an epoxide moiety and the initiator comprises a base with a $pK_a \geqq 11$.

The base with a $pK_a \geqq 11$ is preferably an amine. Suitable amines that can be applied in the context of the present invention are, for instance, 1,4-diazabicyclo-[2,2,2]-octane (DABCO), tetrakisdimethylaminoethylene; amidines like amidine, amidinobenzamide, 1,8-diazabicyclo-[5,4,0]-undec-7-ene (DBU), 1,5-diazabicyclo-[4,3,0]-non-5-ene (DBN), guanidines like carbamidine, tetramethylguanidine, phosphazenes (e.g. compounds known as $P_4$-t-Bu and $P_4$-t-Oct), and derivatives thereof.

Accordingly, in this preferred embodiment of the invention, the base with a $pK_a \geqq 11$ is an amine, more preferably an amine selected from the group of amidines and guanidines and phosphazenes.

According to another preferred embodiment of the invention, the resin contains a non-aromatic carbon double bond moiety and the initiator is a radical generator.

More preferably the radical generator contains a peroxide. The peroxides used for the initiation of the reactions to achieve the chemical anchoring can be any peroxide known to the skilled man for being used in curing of unsaturated polyester resins and vinyl ester resins. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. They can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), and other hydroperoxides (such as, for instance, cumene hydroperoxide), the special class of hydroperoxides formed by the group of ketone peroxides (such as, for instance, methyl ethyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), perethers (such as, for instance, peroxy diethyl ether). Often the organic peroxides used as curing agent are tertiary peresters or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule). In case a solid peroxide is being used for the curing, the peroxide is preferably benzoyl peroxide (BPO).

Preferably, the peroxide is preferably a hydroperoxide, ketone peroxide, perether, perester or peranhydride.

The storage stability of the resin compositions used for chemical anchoring according to the invention is improved if, and this is preferred, the resin composition further comprises one or more inhibitors. Preferably at least one of the inhibitors is selected from phenolic compounds, N-oxyl compounds or nitroso compounds.

Suitable examples of inhibitors that can be used in the methods for chemical anchoring according to the invention are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

In the resin compositions used for chemical anchoring according to the invention also fillers can be present. These fillers can be present in any of the components of a multi-component system for use in chemical anchoring. Therefore, according to another embodiment of the invention at least one of the components further comprises one or more fillers.

A wide variety of fillers can be applied like for instance, without being limited thereto, silica, sand, cement, pigments etc. When cement is used as filler, it is preferred also to employ water as diluent, and the water then especially should be present in the component not containing the cement.

The present invention further relates to the use of a 2-component system of which one component contains a thiol group(s) containing component, for chemical anchoring by means of cold curing.

As meant herein, the term "cold curing" relates to curing at ambient temperature, and also to curing at temperatures lower than room temperature, for instance down to about −15° C.

Finally, the present invention relates to a method for chemical anchoring, wherein the method comprises inserting a resin composition as described above in a hole, for example a borehole, and inserting an anchoring element therein.

The invention is further illustrated, without being limited thereto, by the following examples.

Experimental Part

Curing was monitored by means of standard gel time equipment. This monitoring is intended to mean that both the gel time ($T_{gel}=T_{25->35° C.}$ for most of the Examples, respectively $T_{-10->35° C.}$ in Example 2) and peak time ($T_{peak}=T_{25->peak}$ respectively $T_{-10->peak}$ in Example 2) were determined by exotherm measurements according to the method of DIN 16945 when curing the resin with the initiating systems as indicated in the Examples and Comparative Examples. The equipment used therefore was a Soform gel timer, with a Peakpro software package and National Instruments hardware; the waterbath and thermostat used were respectively Haake W26, and Haake DL30. At temperatures below 5° C. a cryostate was used instead of the waterbath.

Shrinkage measurements were performed using a 50 ml picnometer for the determination of the densities before and after curing.

Extraction measurements were performed by grinding 5 g samples and subjecting the grinded sample to Soxhlet extraction with THF during 60 hr.

Measurements of the fail load were performed according to ETAG 001 with a M14 drill hole (14 mm diameter) and M12 anchors (class 10.6 steel, 12 mm diameter) with a setting depth of 130 mm in concrete (B35). After one day at room temperature (20° C.) the anchors were pulled out.

Abbreviations used in the experimental part:
TAIC=triallyl isocyanurate (TAICROSS, Degussa, Hanau, Germany)
TAIC-M=trimethallylisocyanurate (TAICROSS-M, Degussa, Hanau, Germany)
V=accelerator VN-2 (Akzo Nobel, Arnhem, NL)
Mn=manganese ethylhexanoate in mineral spirits (6% Mn) Elementis, Delden, NL)
TC=Trigonox C (Akzo Nobel, Arnhem, NL),
T239=Trigonox 239 (Akzo Nobel, Arnhem, NL)
M50=Butanox M50 (Akzo Nobel, Arnhem, NL)
$CH_{50}$=Perkadox $CH_{50}$ L (Akzo Nobel, Arnhem, NL)
DIPT=diisopropanol-p-toluidine (BASF, Germany)
SH=pentaerythritol tetramercapto propionate (Bruno Bock, Marschacht, Germany)
TEMPOL=4-hydroxy-2,2,6,6 tetramethylpiperidine-1-oxyl (Degussa, Hanau, Germany)
HPMA=hydroxypropyl methacrylate
BDDMA=butanediol dimethacrylate
DCPD=dicyclopentadiene
DBU=diazabicycloundecene
TMG=tetramethylguanidine
DETA=diethylene triamine
DMPT=dimethyl-para-toluidine
CD540=ethoxylated bisphenol A dimethacrylate (Cray Valley, France)

Synthesis of Resin A

A 2 l reactor equipped with a mechanical stirrer and a Dean Stark set-up was charged with 335 g trimethylolpropane, 742 g crotonic acid, 2 g Fascat 4101 and 55 gram toluene. The reaction mixture was heated to reflux and the water was removed azeotropic during 26 hr. Next the toluene and the excess crotonic acid were distilled off resulting in a resin with an acid value of 2. This resin was heated to 165° C. and 570 g DCPD was added slowly during 5 hr whilst maintaining the reaction temperature between 165 and 180° C. After complete addition the reaction was kept at 170° C. during 2 more hr before vacuum was applied (15 mbar) during 2 hr after which Resin A with an acid value of 1 was obtained.

Synthesis of Resin B

A 2 l reactor equipped with a mechanical stirrer and a Dean Stark set-up was charged with 272 g pentaerythritol, 10.6 g p-toluenesulphonic acid, 1.1 g di-tert-butylhydroquinone, 1.1 g Ultranox 626 (Ciba, Basel, Switzerland), 791 g crotonic acid and 213 g toluene. The reaction mixture was heated to reflux and the water was removed azeotropic during 26 hr. Next 7.5 g trimethylolpropane oxetane was added and the reaction mixture was stirred at 100° C. for an additional hour before the toluene and the excess crotonic acid were distilled off. This resin was heated to 170° C. and 630 g DCPD was added slowly during 5 hr whilst maintaining the reaction temperature between 165 and 180° C. After complete addition the reaction was kept at 170° C. during 2 more hr before vacuum was applied (15 mbar) during 2 hr after which Resin B with an acid value of 1 was obtained.

Synthesis of Resin C

A 1 l reactor equipped with a mechanical stirrer and a Dean Stark set-up was charged with 134 g trimethylolpropane and 29 g maleic anhydride. After heating this mixture to 200° C. during 14 hr the mixture was cooled to 100° C. and 60 g toluene and 3 g Fascat 4101 were added after which the mixture was kept at reflux for another 2 hr. Next 260 g crotonic acid was added. The reaction mixture was heated to reflux and the water was removed azeotropic during 26 hr. Next the toluene and the excess crotonic acid were distilled off resulting in a resin with an acid value of 3. This resin was heated to 165° C. and 180 g DCPD was added slowly during 5 hr whilst maintaining the reaction temperature between 165 and 180° C. After complete addition the reaction was kept at 170° C. during 2 more hr before vacuum was applied (15 mbar) during 2 hr after which Resin C with an acid value of 1 was obtained.

Synthesis of Resin D 300 g DCPD and 700 g TAIC were charged to a 2 l high pressure reactor (Premex HPM-P). Before closure the reactor was flushed 3 times with nitrogen. The reactor was closed and heated to 180° C. during which the pressure rose to 2.5 bar. The reaction mixture was stirred at 180° C. during an additional 6 hr after which the reaction mixture was allowed to cool to room temperature. The resin was transferred into a 1 l flask and the excess DCPD was removed at 160° C. under vacuum resulting in Resin D, having an acid value of 0.

Synthesis of Resin E

A reaction flask equipped with a mechanical stirrer and a reflux condenser was charged with 125 g trimethylolpropane diallyl ether (TMPDE80, Perstorp) and 0.15 g dibutyltin dilaurate and heated to 60° C. Next 72.7 g isophorone diisocyanate was added slowly whilst maintaining the temperature below 75° C. Next the reaction mixture was stirred for another 2 hours after which it was cooled down to room temperature resulting in Resin E, having an acid value of 0.

Synthesis of Resin F

A reaction flask equipped with a mechanical stirrer and a reflux condenser was charged with 150 g trimethylolpropane diallyl ether (TMPDE90, Perstorp) and 0.2 g dibutyltin dilaurate and heated to 60° C. Next, 58 g isophorone diisocyanate was added slowly whilst maintaining the temperature below 75° C. Subsequently, the reaction mixture was stirred for another 2 hours after which it was cooled down to room temperature resulting in Resin F, having with an acid value of 0.

Synthesis of Resin G 400 g DCPD and 500 g TAIC were charged into a 2 l high pressure reactor (Premex HPM-P). Before closure the reactor was flushed 3 times with nitrogen. The reactor was closed and heated to 180° C. during which the pressure rose to 2.5 bar. The reaction mixture was stirred at 180° C. during an additional 6 hours after which the reaction mixture was allowed to cool to room temperature. The resin was transferred in to a 1 l flask and the excess DCPD was removed at 160° C. under vacuum resulting in Resin G, having an acid value of 0.

Synthesis of Resin H

A 2 l reactor equipped with a mechanical stirrer and a Dean Stark set-up was charged with 402 g trimethylolpropane, 147 g maleic anhydride and 1.1 g dibutylhydroquinone. After heating this mixture to 100° C. during 2 hr, 218 g toluene, 10.9 g p-toluenesulphonic acid and 541 g crotonic acid were added. The reaction mixture was heated to reflux and the water was removed azeotropic during 28 hr. Next, 7.7 g trimethylolpropane oxetane was added and the mixture was stirred at 100° C. for an additional hour. Then, the toluene and the excess crotonic acid were distilled off resulting in a yellowish resin. This resin was heated to 165° C. and 550 g DCPD was added slowly during 8 hr whilst maintaining the reaction temperature between 165 and 180° C. After complete addition the reaction was kept at 170° C. during 2 more hr before vacuum was applied (15 mbar) during 2 hr after which Resin H, having an acid value of about 4, was obtained Synthesis of Methacrylate Resin I (by a Method Analogous to the Method of EP 0713015)

To a stirred reactor charged with 575 g MDI and 0.3 g dibutyltin dilaurate was added 71 g dipropyleneglycol at such a rate that the temperature did not exceed 60° C. After stirring for 30 min at 60° C. 792 g HPMA was added and the temperature rose to 90° C. After stirring for 2 hr at 90° C. the mixture was cooled to room temperature and 767 g BDDMA were added.

CURING EXPERIMENTS

EXAMPLES 1.1-1.28

The amount of resin was mixed with the amounts of thiol and inhibitor as indicated in table 1. After stirring for 5 min the initiating system was added and the curing was monitored with the gel timer. The results are shown in table 1

TABLE 1

| | resin composition | | Initiating system | | Inhibitor | | | Peak |
| --- | --- | --- | --- | --- | --- | --- | --- | --- |
| Ex. | ene composition (g) | SH (g) | peroxide (%) | Accelerator (ppm) | Tempol (ppm) | $T_{gel}$ (min) | $T_{peak}$ (min) | Temp (° C.) |
| 1.1 | TAIC (40) | 60 | M50 (1) | V (50) | 500 | 2.4 | 4.2 | 137 |
| 1.2 | TAIC (40) | 60 | M50 (3) | V (160) | 3,000 | 7 | 9 | 194 |
| 1.3 | TAIC (40) | 60 | T239 (2) | V (200) | 0 | 2.2 | 4.9 | 179 |
| 1.4 | TAIC (40) | 60 | T239 (2) | V (200) | 660 | 75 | 82 | 135 |
| 1.5 | TAIC (40) | 60 | TC (2) | 0 | 0 | 4 | 8 | 164 |
| 1.6 | TAIC (40) | 60 | TC (2) | V (10,000) | 1,000 | 12 | 18 | 181 |
| 1.7 | TAIC (40) | 60 | CH50 (4) | V (10,000) | 0 | 4 | 7.4 | 161 |
| 1.8 | TAIC (40) | 60 | 0 | V (30,000) | | 8 | 12 | 179 |
| 1.9 | TAIC (40) | 60 | TC (2) | Mn (10,000) | 0 | 5.1 | 8.3 | 186 |
| 1.10 | A (60) | 40 | M50 (2) | V (200) | 500 | 10.5 | 13.1 | 135 |
| 1.11 | A (60) | 40 | T239 (2) | Mn (10,000) | 270 | 3 | 4 | 142 |

TABLE 1-continued

| | resin composition | | | Initiating system | | Inhibitor | | | Peak |
|---|---|---|---|---|---|---|---|---|---|
| Ex. | ene composition (g) | | SH (g) | peroxide (%) | Accelerator (ppm) | Tempol (ppm) | $T_{gel}$ (min) | $T_{peak}$ (min) | Temp (°C.) |
| 1.12 | A (60) | | 40 | T239 (2) | Mn (5000) | 270 | 7 | 8 | 141 |
| 1.13 | B (44) | TAIC (11) | 45 | TC (2) | V (10,000) | 130 | 48 | 72 | 129 |
| 1.14 | C (60) | | 40 | TC (2) | Mn (10,000) | 550 | 5.7 | 8.4 | 143 |
| 1.15 | C (60) | | 40 | TC (2) | V (10,000) | 500 | 372 | 395 | 63 |
| 1.16 | C (60) | | 40 | TC (2) | V (10,000) + Cu (500) | 500 | 28 | 31 | 144 |
| 1.17 | D (47.5) | | 52.5 | TC (2) | Mn (10,000) | 500 | 56 | 60 | 167 |
| 1.18 | E (55) | | 45 | M50 (2) | V (280) | 840 | 11.2 | 13.4 | 130 |
| 1.19 | F (55) | | 45 | M50 (2) | V (300) | 1,000 | 7.7 | 9 | 140 |
| 1.20 | TAIC-M (43) | | 57 | TC (2) | V (10,000) | 0 | 1 | 2 | 171 |
| 1.21 | TAIC (37) | TAIC-M (4) | 59 | TC (2) | V (10,000) | 70 | 10 | 11 | 203 |
| 1.22 | A (51) | TAIC-M (5.5) | 43.5 | TC (2) | V (10,000) | 500 | 135 | 141 | 127 |
| 1.23 | A (51) | TAIC-M (5.5) | 43.5 | TC (2) | Mn (10,000) | 500 | 75 | 78 | 141 |
| 1.24 | G (38.5) | TAIC (12.5) | 49 | TC (2) | V (10,000) | 190 | 12 | 15 | 189 |
| 1.25 | G (38.5) | TAIC (12.5) | 49 | T21 (2) | V (10,000) | 190 | 5 | 7 | 171 |
| 1.26 | H (30) | TAIC (20) | 50 | TC (2) | V (10,000) | 500 | 70.3 | 77.2 | 161 |
| 1.27*) | H (36) | TAIC (18) | 48 | TC (2) | V (10,000) | 500 tBC | 3.3 | 8.5 | 170 |
| 1.28**) | CD540 (90) | | 10 | CH50 | DMPT (4000) | 5,000 | 7.8 | 10.2 | 102 |

*)In example 1.27 t-butyl catechol tBC was used as inhibitor instead of Tempol.
**)In example 1.28 the ratio thiol vs. non-aromatic double bond moieties is about 1:4.

These examples demonstrate that a wide variety of resin compositions can be used according to the invention, together with various peroxides and using various accelerators and a wide range in amounts of a large group of inhibitors.

Example 1.8 further demonstrates that initiation can even be achieved without the addition of a peroxide. Example 1.5 demonstrates that curing also can be performed without the addition of an accelerator

EXAMPLES 2.1 AND 2.2

Resin compositions using pentaerythritol tetramercaptopropionate as thiol, and including an inhibitor, were prepared and cooled to −10° C. Thereafter accelerator solution and peroxide were added that also had been cooled to −10° C. The curing was monitored using the gel timer equipment with a bath temperature of −10° C.

The results are shown in table 2:

TABLE 2

| | Resin Composition | | | Initiating system | | | | Peak |
|---|---|---|---|---|---|---|---|---|
| Ex. | TAIC (g) | SH (g) | TEMPOL ppm | V (%) | M50 (%) | $T_{-10-35° C.}$ (min) | $T_{peak}$ (min) | Temp (°C.) |
| 2.1 | 40 | 60 | 1,000 | 1 | 3 | 20 | 21 | 165 |
| 2.2 | 40 | 60 | 2,000 | 1 | 3 | 55 | 57 | 145 |

These examples show that compositions according to the invention can be applied for curing at low temperatures.

EXAMPLE 3

A composition of 120 g SH and 80 g TAIC, inhibited with 200 ppm Tempol, was prepared and split into 2 portions of 100 g each. The first of these 100 g portions was cured with 1% V and 2% TC, resulting in the following cure characteristics $T_{gel}$=53 min, $T_{peak}$=56 min, Peak temperature=192° C. To the other portion 5 g water was added, followed by stirring during 5 min, after which 1% V and 2% TC were added, resulting in the following cure characteristics $T_{gel}$=38 min, $T_{peak}$=41 min Peak temperature=165° C.

These results clearly indicate that efficient curing also can be performed under moist conditions

EXAMPLES 4.1-4.5

A composition of pentaerythritol tetramercaptopropionate and Epon 828 (Resolution, Amsterdam, NL) was prepared. After mixing for 5 min the initiating system was added and the curing was monitored with the gel time equipment. The results are shown in table 3:

TABLE 3

| Ex. | SH | Epon 828 | Initiating system | $T_{25-35° C.}$ (min) | $T_{peak}$ (min) | Peak Temp (°C.) |
|---|---|---|---|---|---|---|
| 4.1 | 33.3 | 66.6 | DBU 0.2% | 3.7 | 7.9 | 176 |
| 4.2 | 33.3 | 66.6 | DBU 1% | 0.5 | 6.2 | 179 |

TABLE 3-continued

| Ex. | SH | Epon 828 | Initiating system | $T_{25\text{-}35°\,C.}$ (min) | $T_{peak}$ (min) | Peak Temp (° C.) |
|---|---|---|---|---|---|---|
| 4.3 | 33.3 | 66.6 | TMG 0.2% | 1.6 | 5.5 | 156 |
| 4.4 | 33.3 | 66.6 | DETA 0.9%, DBU 0.1% | 6.9 | 32.3 | 93 |
| 4.5 | 33.3 | 66.6 | DETA 1.8%, DBU 0.2% | 3.4 | 13.6 | 178 |

These examples clearly demonstrate that thiols can be used according to the invention for curing in combination with epoxides.

EXAMPLE 5 and COMPARATIVE EXAMPLE A

In Example 5, series of 4 mm castings were prepared from a 60/40 thiol/TIAC mixture containing 100 ppm TEMPOL which was cured with 1% VN-2 and 2% Trigonox C.

In the Comparative Example A, series of 4 mm castings were prepared from the methacrylate Resin I containing 0.45% Tempol, which was cured with 4% CH50 and 1.7% DIPT The results of the castings (average values for five castings) are shown in the table below:

|  | Example 5 | Comparative Example A |
|---|---|---|
| shrinkage (%) | 7 | 16 |
| extractables (%) | 3 | 17 |

This example and the comparative experiment clearly demonstrate the lower amount of extractables and the lower amount of shrinkage when employing compositions according to the invention and containing thiols.

EXAMPLES 6.1-6.7

The following compositions were prepared for pull-out tests:

|  | 6.1 | 6.2 | 6.3 | 6.4 | 6.5 | 6.6 | 6.7 |
|---|---|---|---|---|---|---|---|
| Resin (g) | TAIC (40) | A (60) CN02 | D (47.5) TAIC N02 | TAIC (40) | A (60) CN02 | D (47.5) TAIC N02 | G (38.5)/ TAIC (13) 51.5 TAIC-N01/TAIC |
| SH (g) | 60 | 40 | 52.5 | 60 | 40 | 52.5 | 48.5 |
| TEMPOL (g) | 0.01 | 0.02 | 0.035 | 0.01 | 0.02 | 0.035 | 0.03 |
| V (g) | 1 | 1 | 1 | 1 | 1 | 1 | 1 |
| Sand (g) |  |  |  | 100 | 100 | 100 | 100 |
| Aerosil R202 (g) |  |  |  | 4 | 4 | 4 | 4 |
| TC (g) | 2 | 2 | 2 | 2 | 2 | 2 | 2 |
| Fail load at 20° C. (kN) | 55 ± 6 | 61 ± 12 | 70 ± 7 | 42 ± 2 | 53 ± 4 | 70 ± 4 | 67 ± 8 |

Aerosil R202: thixotropic agent (Degussa, Hanau, Germany)
Sand: Crystal Quartz sand: G0-0, 3T fire dried (Schlingmeier, Schwulper, Germany)

For comparison it should be noted that the fail load at 25° C. according to EP 0713015 is cited to be around 50 kN.

For further comparison a commercial chemical anchoring system (HILTI HIT-HY150) was evaluated and the fail loads were around 65 kN.

Furthermore it should be noted that with fail loads around 70 kN the concrete was completely cracked, indicating that the concrete is weaker than the strength of the anchor.

These experiments clearly demonstrate that the compositions according to the invention are suitable for chemical anchoring.

Visual inspection of the anchors pulled-out revealed that, when using the chemical anchoring systems according to the invention, the anchors were fully covered with concrete, whereas in the commercial system the anchors were only up to around 70% covered, the remaining 30% being the bare steel of the anchor. This fact indicates that the systems according to the invention have a better adhesion both towards the steel as well as towards the concrete (in comparison to the current commercial system).

The invention claimed is:

1. A method for chemical anchoring of anchoring elements comprising:
    (1) anchoring an element to a surface selected from boreholes, artificial rock and natural rock with a resin composition comprised of:
        a. a thiol-containing component,
        b. a resin containing non-aromatic carbon double bond moieties as reactive moieties, and
        c. an initiator being a radical generator, wherein the thiol functionality of the thiol-containing component in the resin composition is $\geq 2$ and the molecular ratio between the thiols in the thiol-containing component and the reactive moieties contained in the resin is in the range of from 3:1 to 1:5; and
    (2) allowing the resin to cold cure at ambient temperature down to about −15° C., whereby the anchoring element is anchored to the surface.

2. The method according to claim 1, wherein the resin composition further comprises a diluent.

3. The method according to claim 1, wherein the resin composition is applied as a multi-component system comprised of an A-component and a B-component.

4. The method according to claim 3, wherein either:
    the A-component contains the thiol-containing component and the resin and the B-component contains the initiator, or
    the A-component contains the thiol-containing component and the B-component contains the initiator and the resin, or
    the A-component contains the resin and the B-component contains the initiator and the thiol-containing component,
    the optional diluent being present in the component containing the resin.

5. The method according to claim 1, wherein the thiol in the thiol-containing component of the resin composition is an aliphatic thiol.

6. The method according to claim 5, wherein the aliphatic thiol is an aliphatic thiol ester selected from α-mercapto acetate or β-mercapto propionate.

7. The method according to claim 1, wherein the resin has a molecular weight Mn between 240 and 10,000.

8. The method according to claim 1, wherein the resin has a molecular weight Mn between 500 and 7,000.

9. The method according to claim 1, wherein the non-aromatic carbon double bond moieties comprise at least one double bond moiety selected from the group consisting of allyl, vinyl, (meth)acrylic, fumaric, maleic, itaconic, crotonic, cinnamic moieties, Diels Alder adducts thereof, and bicyclic double bond molecules.

10. The method according to claim 9, wherein the non-aromatic carbon double bond moiety is an allylic double bond moiety or is present in a norbornene compound.

11. The method according to claim 1, wherein the radical generator contains a peroxide.

12. The method according to claim 11, wherein the peroxide is a hydroperoxide, ketone peroxide, perether, perester or peranhydride.

13. The method according to claim 1, wherein the resin composition further comprises one or more inhibitors.

14. The method according to claims 13, wherein at least one of the inhibitors is selected from phenolic compounds, N-oxyl compounds or nitroso compounds.

15. The method according to claim 1, wherein at least one of the components further comprises one or more fillers.

16. A method for chemical anchoring, wherein the method comprises inserting a resin composition according to claim 1 in a hole and inserting an anchoring element therein.

17. The method according to claim 2, wherein the diluent is a reactive diluent.

18. The method according to claim 1, wherein the thiol-functionality of the thiol-containing component in the resin composition >3.

19. The method according to claim 7, wherein the resin has a molecular weight Mn between 240 and 7,000.

20. The method according to claim 19, wherein the resin has a molecular weight Mn between 240 and 5,000.

21. The method according to claim 8, wherein the resin has a molecular weight Mn of between 1,000 and 5,000.

22. The method according to claim 1, wherein the molecular ratio between the thiols in the thiol-containing component and the reactive moieties contained in the resin is in the range of from 1.5:1 to 1:2.

23. The method according to claim 22, wherein the molecular ratio between the thiols in the thiol-containing component and the reactive moieties contained in the resin is about 1:1.

* * * * *